(12) United States Patent
McGarry et al.

(10) Patent No.: US 8,837,508 B2
(45) Date of Patent: Sep. 16, 2014

(54) SYSTEMS AND METHODS FOR ALLOCATING BONDING ENGINES IN NETWORK COMMUNICATIONS

(75) Inventors: Michael P. McGarry, Chandler, AZ (US); Kevin W. Schneider, Huntsville, AL (US); W. Stuart Venters, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 413 days.

(21) Appl. No.: 12/497,125

(22) Filed: Jul. 2, 2009

(65) Prior Publication Data

US 2010/0027557 A1 Feb. 4, 2010

Related U.S. Application Data

(60) Provisional application No. 61/084,810, filed on Jul. 30, 2008.

(51) Int. Cl.
*H04L 12/28* (2006.01)
(52) U.S. Cl.
CPC .............. *H04L 12/2867* (2013.01); *Y02B 60/33* (2013.01)
USPC ........... 370/431; 370/219; 370/242; 370/383; 370/395; 370/535
(58) Field of Classification Search
USPC .................... 370/382, 431, 465, 535; 709/249
See application file for complete search history.

(56) References Cited

U.S. PATENT DOCUMENTS

| | | | |
|---|---|---|---|
| 6,128,300 A | 10/2000 | Horton | |
| 6,483,029 B1 | 11/2002 | Lutz, Jr. | |
| 6,560,201 B1 | 5/2003 | Amann et al. | |
| 6,724,880 B1 | 4/2004 | Lynch | |
| 6,801,533 B1 | 10/2004 | Barkley | |
| 6,862,644 B1 | 3/2005 | Pendleton et al. | |
| 7,065,038 B1 | 6/2006 | Brandt et al. | |
| 7,106,760 B1 | 9/2006 | Perumal et al. | |
| 2003/0048802 A1* | 3/2003 | Shenoi | 370/458 |
| 2004/0068589 A1* | 4/2004 | Witkowski et al. | 709/249 |
| 2004/0114510 A1 | 6/2004 | Miller et al. | |
| 2004/0136368 A1 | 7/2004 | Wakayama et al. | |
| 2005/0243497 A1 | 11/2005 | Cameron et al. | |
| 2007/0237172 A1* | 10/2007 | Zelig et al. | 370/465 |
| 2008/0151748 A1* | 6/2008 | Virgilio et al. | 370/229 |

OTHER PUBLICATIONS

Goodson, et al., U.S. Appl. No. 11/074,918, entitled, "Network Access Device and Method for Protecting Subscriber Line Communications," filed Mar. 8, 2005.

(Continued)

*Primary Examiner* — David Oveissi
(74) *Attorney, Agent, or Firm* — Maynard Cooper & Gale, P.C.; Jon E. Holland

(57) ABSTRACT

The present disclosure generally pertains to systems and methods for allocating bonding engines among bonding groups. In one exemplary embodiment, a provision module is configured to allocate bonding engines. When selecting a bonding engine for a new bonding group, the provision module only considers bonding engines residing on access modules that terminate at least one of the communication links of the bonding group. Out of the bonding engines residing on access modules terminating at least one communication link of the bonding group, the provision module selects a bonding engine servicing the least number of external links and assigns the selected bonding engine to the bonding group. The provision module also provisions the access modules terminating the communication links of the bonding group such that the selected bonding engine bonds such communication links during operation.

22 Claims, 8 Drawing Sheets

(56) References Cited

OTHER PUBLICATIONS

ITU—Telecommunications Standardization Sector, Study Group 15, "Centralized Bonding for G. Bond," Jul. 7-11, 2003, pp. 1-3.
Rushing, et al., U.S. Appl. No. 12/359,041, entitled, "Systems and Methods for Protecting Bonding Engines in Network Communications," filed Jan. 23, 2009.
Kalyanasundaram, et al., "Online Weighted Matching," Journal of Algorithms 14, 478-488, (1993).
Crescenzi, et al., "On-line algorithms for the channel assignment problem in cellular networks," Discrete Applied Mathematics 137, 237-266, (2004).

\* cited by examiner

US 8,837,508 B2

SYSTEMS AND METHODS FOR ALLOCATING BONDING ENGINES IN NETWORK COMMUNICATIONS

CROSS REFERENCE TO RELATED APPLICATION

This application claims priority to U.S. Provisional Patent Application No. 61/084,810, entitled "Bonding Engine Selection for Communication System," and filed on Jul. 30, 2008, which is incorporated herein by reference.

RELATED ART

In telecommunication networks, multiple physical links (e.g., subscriber lines) are sometimes used to provide a virtual channel having a higher data bandwidth than that of any of the individual links making up the virtual channel. The logic used to implement the virtual channel is referred to as a "bonding engine," and the physical links are referred to as being "bonded" together by the bonding engine to form the virtual channel. Further, the multiple links that are bonded together to form a virtual channel are referred to as a "bonding group."

Typically, a bonding engine within a network, referred to hereafter as a "network bonding engine," receives a data stream to be communicated to a customer premises (CP) and divides the data across subscriber lines extending from a network facility (e.g., a central office) to the customer premises. A bonding engine at the customer premises, referred to hereafter as a "CP bonding engine," receives the data from the multiple subscriber lines and reassembles the data to form the original data stream received and divided by the network bonding engine. Similarly, a data stream to be communicated from the customer premises through the network is received by the CP bonding engine, which divides the data across the multiple subscriber lines. The network bonding engine receives such data and reassembles the data to form the original data stream received and divided by the CP bonding engine. In essence, subscriber line bonding allows a data stream to be fragmented and communicated across multiple subscriber lines to enable a higher aggregated data rate.

In a network facility, such as a central office, subscriber lines are terminated by circuitry residing on a printed circuit board, sometimes referred to as a "line card." At any network facility, there can be many (e.g., several thousand) line cards, which are typically held in slots of several chassis. Each line card is interfaced with a chassis backplane that enables the card to communicate with various network equipment. If a line card experiences an operational problem, such as losing electrical connectivity with the chassis backplane, then communication via any of the subscriber lines terminated by the card and/or any bonding engine residing on the line card may be interrupted and/or degraded until the problem is discovered, diagnosed, and remedied.

Techniques for improving the reliability and robustness of telecommunication networks and, in particular, bonding groups within telecommunication networks are generally desired.

One way to increase the robustness of the network is to terminate the subscriber lines for a bonding group in the central office on multiple line cards. This presents a problem in choosing the optimal place (line card) to put the network bonding engine for the bonding group.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for allocating bonding engines among bonding groups. In one exemplary embodiment, a provision module is configured to allocate bonding engines. When selecting a bonding engine for a new bonding group, the provision module only considers bonding engines residing on access modules that terminate at least one of the communication links of the bonding group. Out of the bonding engines residing on access modules terminating at least one communication link of the bonding group, the provision module selects a bonding engine servicing the least number of external links and assigns the selected bonding engine to the bonding group. The provision module also provisions the access modules terminating the communication links of the bonding group such that the selected bonding engine bonds such communication links during operation.

Figure 1:
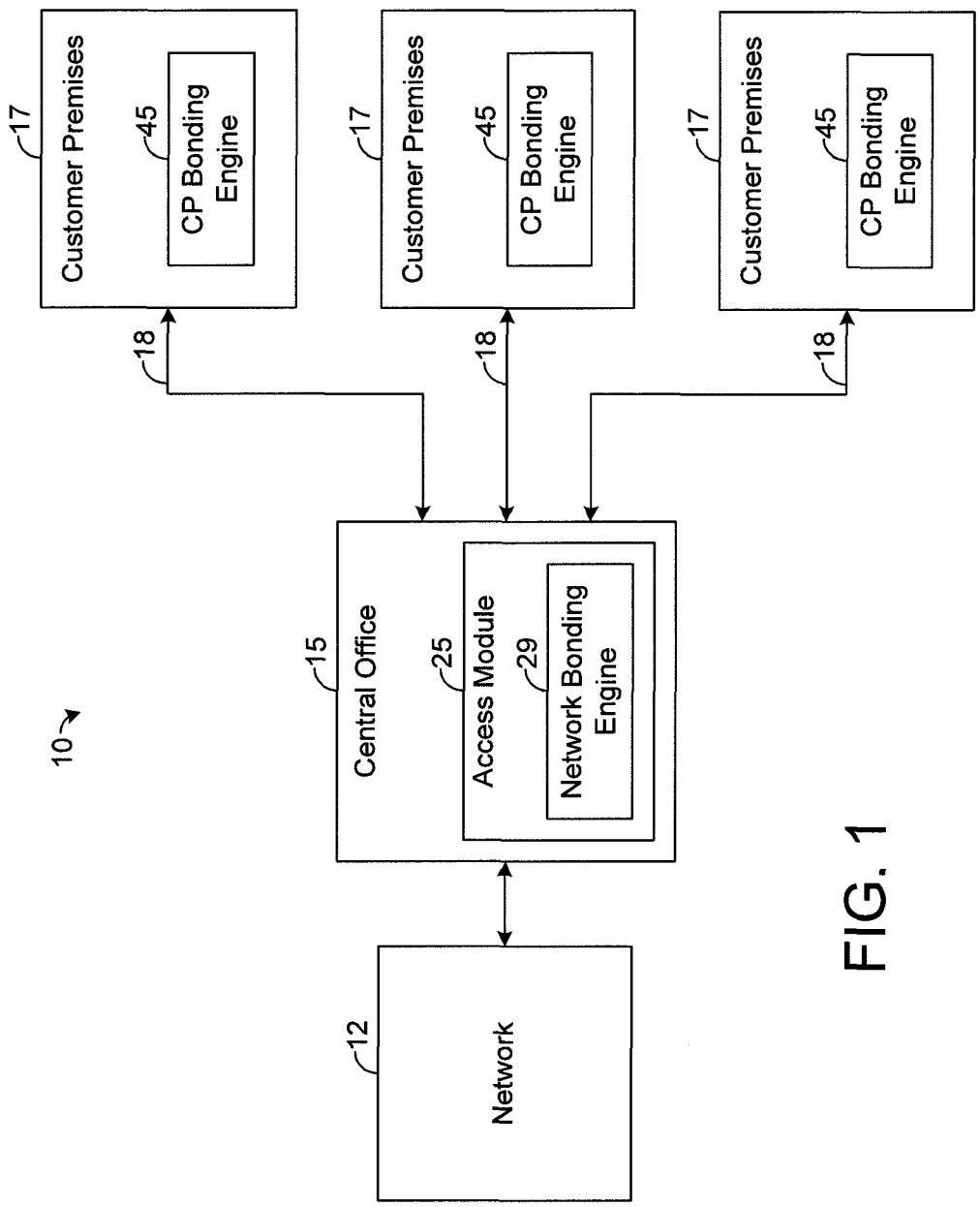
FIG. 1 is a block diagram illustrating an exemplary embodiment of a telecommunication system.

FIG. 1 depicts an exemplary embodiment of a telecommunication system 10 in accordance with the present disclosure. The system 10 has a network 12, such as the Public Switched Telephone Network (PSTN) or Internet, that routes data. A network facility, such as a central office (CO) 15, receives from the network 12 data destined for equipment at customer premise (CP) 17 and transmits such data to the customer premise 17 via a plurality of communication links, such as subscriber lines 18. Further, data from the customer premise 17 are received by the central office 15, which interfaces such data with the network 12 for routing. Various types of protocols may be used for the communication between the central office 18 and the customer premise 17. As an example, data may be communicated between the central office 15 and any customer premises 17 via various digital subscriber line (DSL) protocols, such as Asymmetric Digital Subscriber Line (ADSL), High-Bit-rate Digital Subscriber Line (HDSL), HDSL2, HDSL4, Very-high-data-rate Digital Subscriber Line (VDSL), etc. In other embodiments, other types of protocols may be used to communicate data between the central office 15 and the customer premise 17. As shown by FIG. 1, the central office 15 has at least one access modules 25 on which a bonding engine 29 is mounted.

Figure 2:
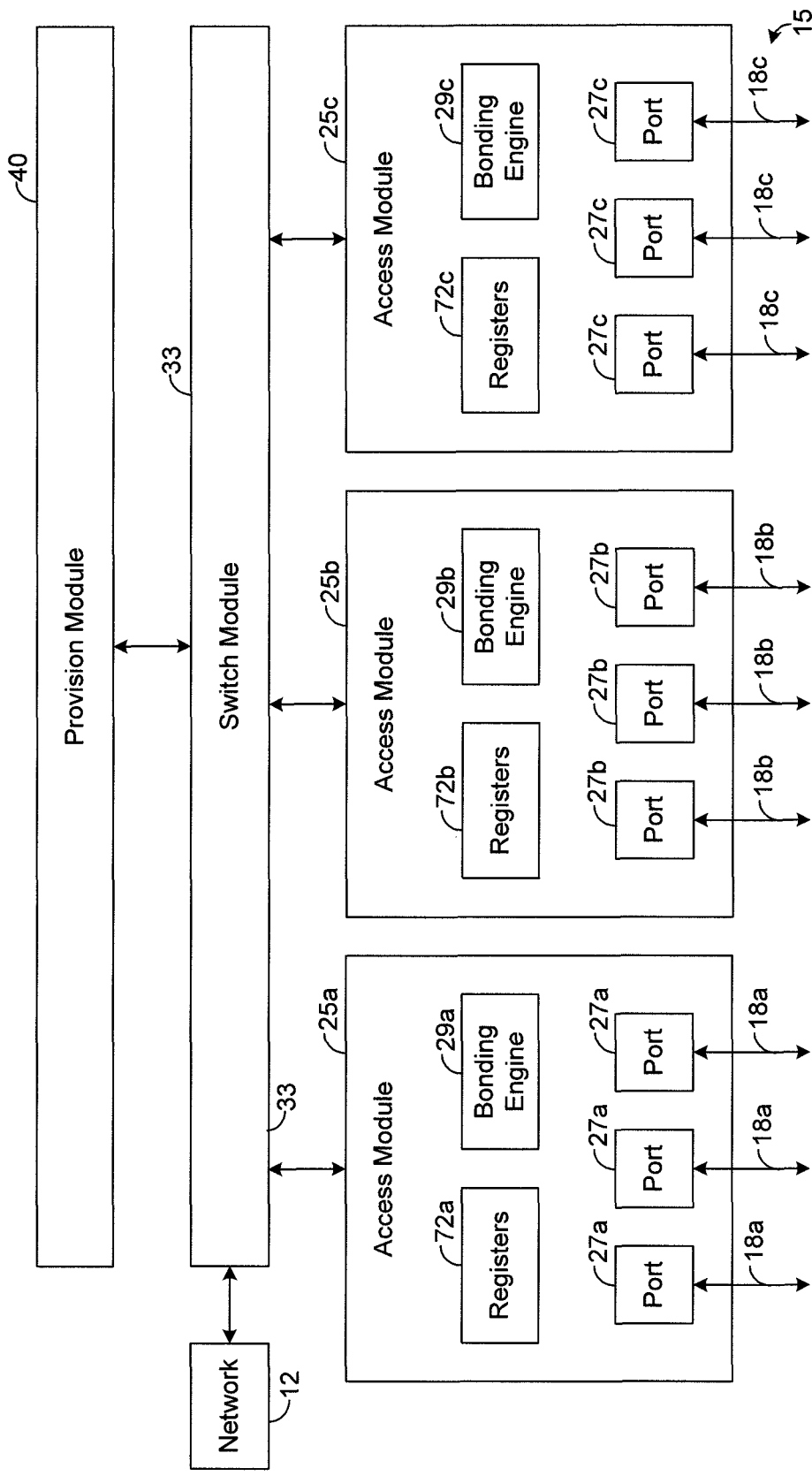
FIG. 2 is a block diagram illustrating an exemplary embodiment of equipment at a network facility, such as a central office.

FIG. 2 depicts an exemplary embodiment of equipment residing at the central office 15 or other network facility, such as a remote terminal. The central office 15 has a plurality of access modules 25a-c that are coupled to and terminate subscriber lines 18a-c. In particular, the access modules 25a-c have ports 27a-c that are respectively coupled to and interfaced with subscriber lines 18a-c. Each port 27a-c has a unique address that identifies the port from the other ports of the access modules 25a-c. A portion of each port address identifies the module 25a-c on which the port 27a-c resides. Thus, the port addresses may be used to switch data among the modules 25a-c, as will be described in more detail hereafter.

As shown by FIG. 2, each access module 25a-c has at least one bonding engine 29a-c and at least one register 72a-c, which will be described in more detail below. Each access module 25a-c is coupled to a switch module 33, which switches data between the modules 25a-c and the network 12. In this regard, the switch module 33 receives from the network 12 data packets that are destined for equipment at the customer premise 17. Each data packet has a header and a data portion. Control and routing information is included in the header, and payload data is included in the data portion. As an example, the header of a data packet may include a destination address identifying a communication device at a customer premises 17 to which the data packet is to be routed. In one exemplary embodiment, the header includes a Virtual Local Area Network (VLAN) tag. Other types of information may be included in the header, as is known in the art. In one exemplary embodiment, the data packets received from the network 12 are in accordance with Ethernet protocol, but other types of packet protocols may be used in other embodiments.

For each packet received from the network 12, the switch module 33 transmits the packet to the appropriate access module 25a-c based on information in the packet's header, such as the destination address or VLAN tag included in the header. In one exemplary embodiment, all of the packets to be carried by the same bonding group (e.g., having the same destination address or VLAN tag) are routed to the same access module 25a-c. For example, assume that a customer premises 17 is serviced by a bonding group for which the bonding engine 29a bonds a plurality of subscriber lines 18a-c. Upon receiving a data packet, referred to hereafter as the "original data packet," that is to be communicated to such customer premises 17 by the bonding group, the switch module 33 is configured to transmit the original data packet to the access module 25a. When the original data packet is received by the module 25a, the bonding engine 29a is configured to fragment the original data packet into a plurality of fragments. Each of the fragments is to be transmitted by a respective one of the subscriber lines 18a-c of the bonding group. Each fragment is a data packet that may be smaller than the original data packet. In this regard, each fragment has a header and a data portion, although any of the fragments may be larger than the original data packet, if desired. For each fragment, control and routing information is included in the header, and payload data is included in the data portion. As an example, the header may identify the port address of the port 27a-c that is coupled to the subscriber line 18a-c that is to carry the fragment. In one exemplary embodiment, fragments are packetized in accordance with the same protocol used for the original data packet. For example, the original data packet and the fragments may be packetized in accordance with Ethernet protocol. Other types of protocols are possible in other embodiments, and it is possible for the fragments to be packetized in accordance with a different protocol relative to the packets from the network 12.

Note that one or more of the subscriber lines 18a-c of a bonding group may be coupled to and terminated by the same access module on which the group's bonding engine resides. It is unnecessary for the fragments carried by such subscriber lines 18a-c to be transmitted through the switch module 33. As an example, assume that the bonding engine 29a bonds a plurality of subscriber lines 18a-c, including one subscriber line 18a that is coupled to and terminated by the access module 25a on which the bonding engine 29a resides. When the bonding engine 29a provides a fragment to be carried by such subscriber line 18a, the fragment may be transmitted directly to the port 27a coupled to such subscriber line 18a without being communicated through the switch module 33. However, fragments provided by the bonding engine 29a to be carried by subscriber lines 18b-c terminated by other modules 25b-c are transmitted to the switch module 33. For each such fragment, the switch module 33 analyzes the fragment's header and, based on the port address of such fragment, transmits the fragment to the module 25b-c on which the identified port 27b-c resides. Thus, any of the bonding engines 29a-c can bond any of the subscriber lines 18a-c regardless of whether a given subscriber line is terminated by the same access module on which the bonding engine resides.

In fact, it may be desirable to ensure that at least some of the subscriber lines are bonded by a bonding engine residing on an access module different than the one that terminates such subscriber lines. In this regard, by having subscriber lines 18a-c of the same bonding group terminated by multiple access modules 25a-c, the bonding group is able to survive a failure of any of the access modules 25a-c. For example, assume that the bonding engine 29a bonds a plurality of subscriber lines 18a-b terminated by modules 25a-b. If the access module 25b fails, then communication across the subscriber lines 18b coupled to the failed access module 25b may be lost at least temporarily. In such a situation, the bonding group's traffic may be communicated across the subscriber lines 18a terminated by the module 29a. Note that the aggregate data rate for the virtual channel provided by the bonding group may be slightly degraded due to the loss of the subscriber lines 18b terminated by the failed access module 25b, but the bonding group nevertheless survives the module failure. Commonly-assigned U.S. patent application Ser. No. 12/359,041, entitled "Systems and Methods for Protecting Bonding Engines in Network Communications," and filed on Jan. 23, 2009, which is incorporated herein by reference, describes exemplary techniques for protecting bonding groups and, in particular, bonding engines that reside on failed access modules. Commonly-assigned U.S. patent application Ser. No. 11/074,918, entitled "Network Access Device and Method for Protecting Subscriber Line Communications," and filed on Mar. 8, 2005, which is incorporated herein by reference, describes exemplary techniques for bonding across multiple modules.

As shown by FIG. 2, the central office 15 also has a provision module 40. As will be described in more detail hereafter, the provision module 40 is configured to provision the modules 25a-c and 40 in order to control the bonding performed by the access modules 25a-c in a desired manner.

Note that, for each bonding group, there is only one bonding engine to which all of the data packets to be communicated by the bonding group are routed. Such bonding engine may be located on any of the access modules 25a-c. However, in other embodiments, it is possible to distribute the bonding engine for any bonding group across multiple access modules 25a-c, if desired.

In addition, the same bonding engine can be used to bond multiple bonding groups. However, the total number of subscriber lines 18a-c that can be bonded by any single bonding engine is typically limited depending on various design constraints. In other words, for each bonding engine 29a-c, there is a maximum number of subscriber lines 18-c that can be bonded by that engine 29a-c at any given time.

Note that data from the customer premise 17 may be communicated via paths reverse to those described above. In this regard, assume that a bonding engine 45 (FIG. 1) at a customer premises 17 fragments a message into a plurality of fragments that are communicated via a bonding group to the central office 15. The group's bonding engine 29a-c at the central office 15 is configured to receive each of the fragments and to reassemble the fragments into the message originally fragmented by the CP bonding engine 45. The message is then packetized and transmitted through the switch module 33 to the network 12.

Figure 3:
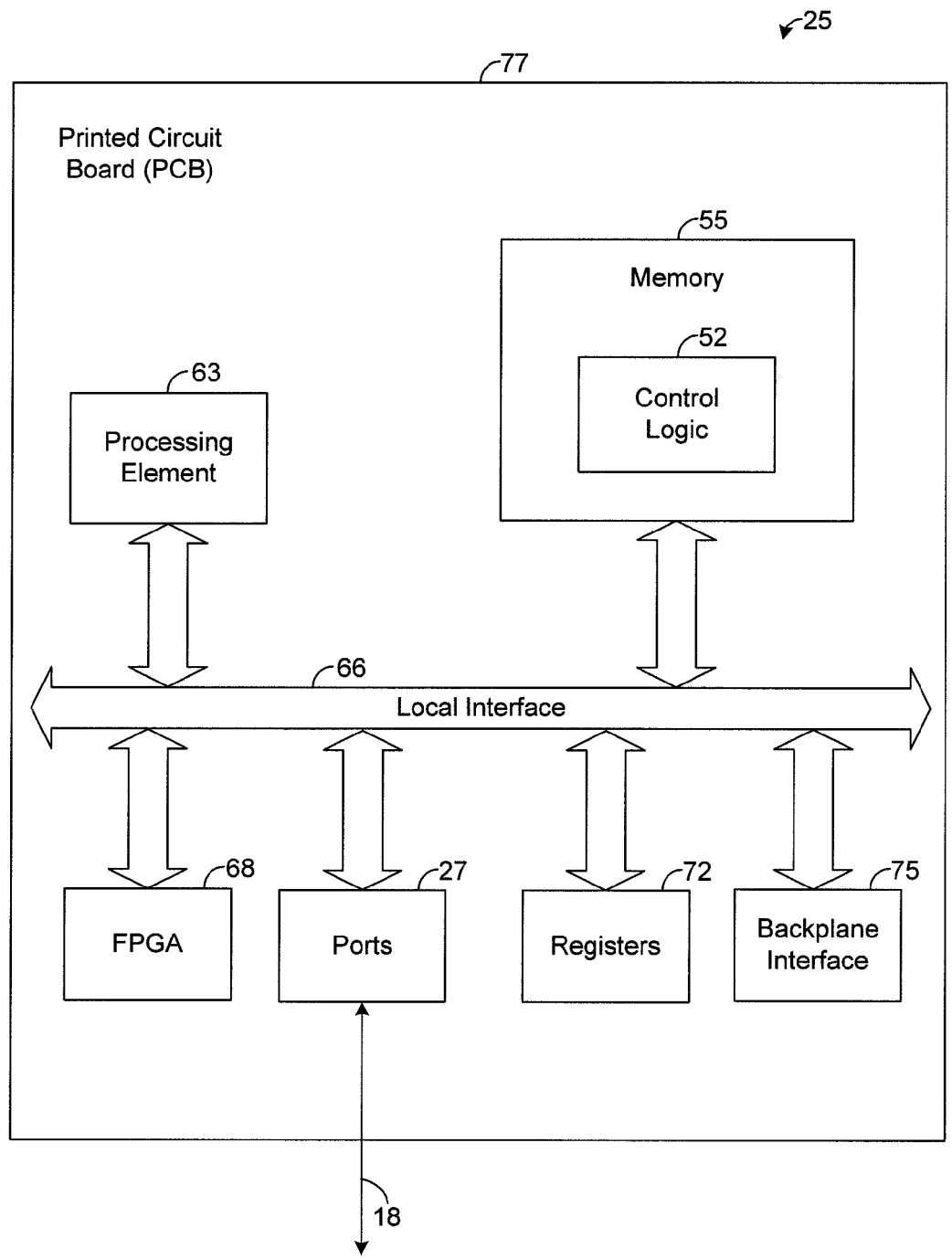
FIG. 3 is a block diagram illustrating an exemplary embodiment of an access module, such as is depicted by FIG. 2.

Each access module 25a-c comprises various hardware for terminating and driving the subscriber lines 18a-c terminated by such access module. However, if desired, the access modules 25a-c may include software, firmware, and/or other hardware for performing other functions. Indeed, the components of the access modules 25a-c may be implemented in hardware or a combination of hardware, software, and/or firmware. FIG. 3 depicts an exemplary embodiment of an access module 25. The exemplary access module 25 shown by FIG. 3 comprises control logic 52 implemented in software and stored in memory 55. The control logic 52, when implemented in software, can be stored and transported on any computer-readable medium for use by or in connection with an instruction execution apparatus that can fetch and execute instructions. In one exemplary embodiment, each access module 25a-c shown by FIG. 2 is configured as shown by FIG. 3, but other configurations of the modules 25a-c are possible in other embodiments.

The exemplary embodiment of the access module 25 depicted by FIG. 3 comprises at least one conventional processing element 63, such as a digital signal processor (DSP) or a central processing unit (CPU), that communicates to and drives the other elements within the module 25 via a local interface 66, which can include at least one bus. For example, when the control logic 52 is implemented in software, the processing element 63 retrieves and executes instructions of the control logic 52.

Furthermore, the access module 25 comprises a field programmable gate array (FPGA) 68 for implementing hardware portions of the module 25, such as the module's bonding engine 29 if such engine is implemented in hardware. The access module 25 also has registers 72 for storing various configuration settings, as will be described in more detail hereafter. A backplane interface 75 comprises a connector for interfacing the module 25 with a backplane of a chassis (not shown in FIG. 3), as will be described in more detail hereafter. The access module further has a plurality of ports 27 coupled to subscriber lines 18.

As shown by FIG. 3, the components of the module 25 reside on a single printed circuit board (PCB) 77, and the access module 25 is sometimes referred to as a "line card" or just "card." However, it is possible for the components of the access module 25 to reside on more than one PCB, if desired.

The registers 72 store various configuration settings useful in the operation of the access module 25. In this regard, the configuration settings preferably specify how various data packets and/or fragments are to be handled. As an example, the configuration settings may indicate how fragments received from a subscriber line are to be processed. In this regard, the configuration settings may indicate which of the bonding engines 29a-c (FIG. 2) is to receive a fragment from a particular subscriber line terminated by the module 25. Further, the configuration settings may indicate how fragments received from a bonding on another access module are to be processed.

For example, the configuration settings may correlate the destination addresses or VLAN tags of data packets from the network 12 with port addresses. The bonding engine residing on the module 25 may use such configuration settings to allocate fragments across the subscriber lines 18 of a bonding group. For example, assume that a particular bonding group is to carry the data from data packets having a particular VLAN address. Further assume that the bonding engine 29a (FIG. 2) services such bonding group. In such example, the configuration settings in the registers 72a of the access module 25a may correlate the foregoing VLAN address with the port addresses for the subscriber lines 18a-c of the bonding group (i.e., the port addresses identifying the ports 27a-c to which the subscriber lines 18a-c of the bonding group are coupled). The bonding engine 29a uses such port addresses when fragmenting a data packet having the foregoing VLAN tag. In this regard, for the fragments from such data packet, the bonding engine 29a selects from the correlated port addresses for insertion into the fragment headers. Thus, the fragments from the data packet are only transmitted to and carried by the subscriber lines 18a-c of the bonding group.

Note that port addresses inserted into the fragment headers are used by the switch module 33 to switch the fragments. In this regard, as described above, a group's bonding engine 29, based on the configuration settings in the registers 72, inserts a respective port address into the header of each fragment. Some of the fragments may be carried by "local" subscriber lines, and some of the fragments may be carried by "external" subscriber lines. A subscriber line 18 is "local" relative to a particular access module 25 if it is coupled to a port on the access module 25 such that the line 18 is terminated by circuitry on the access module 25. On the other hand, a subscriber line 18 is "external" relative to a particular access module 25 if it is not terminated by the access module 25. For example, the subscriber lines 18a coupled to and terminated by the ports 27a of the access module 25a are local to such access module 25a, but the other subscriber lines 18b-c, which are coupled to and terminated by the ports 27b-c of other access modules 25b-c, are external to the access module 25a. Further, the phrase "local to the access module" shall be used interchangeably herein with the phrase "local to the bonding engine" residing on such access module. Thus, if a subscriber line is local to an access module 25, it is also "local" to the bonding engine 29 residing on such access module 25 meaning that the subscriber line is coupled to a port of the access module 25 and is terminated by the access module 25.

In any event, when a bonding engine 29 on an access module 25 fragments a data packet thereby providing a plurality of fragments, the fragments that are to be carried by subscriber lines 18 that are local to such module 25 are interfaced directly with the local lines 18 without being transmitted through the switch module 33. However, the fragments that are to be carried by subscriber lines 18 that are external to such module 25 are transmitted to the switch module 33, which forwards the fragments based on the port addresses in the fragments' headers. In this regard, for each fragment, the switch module 33 transmits the fragment to the access module that has the port identified by the fragment's port address.

Figure 4:
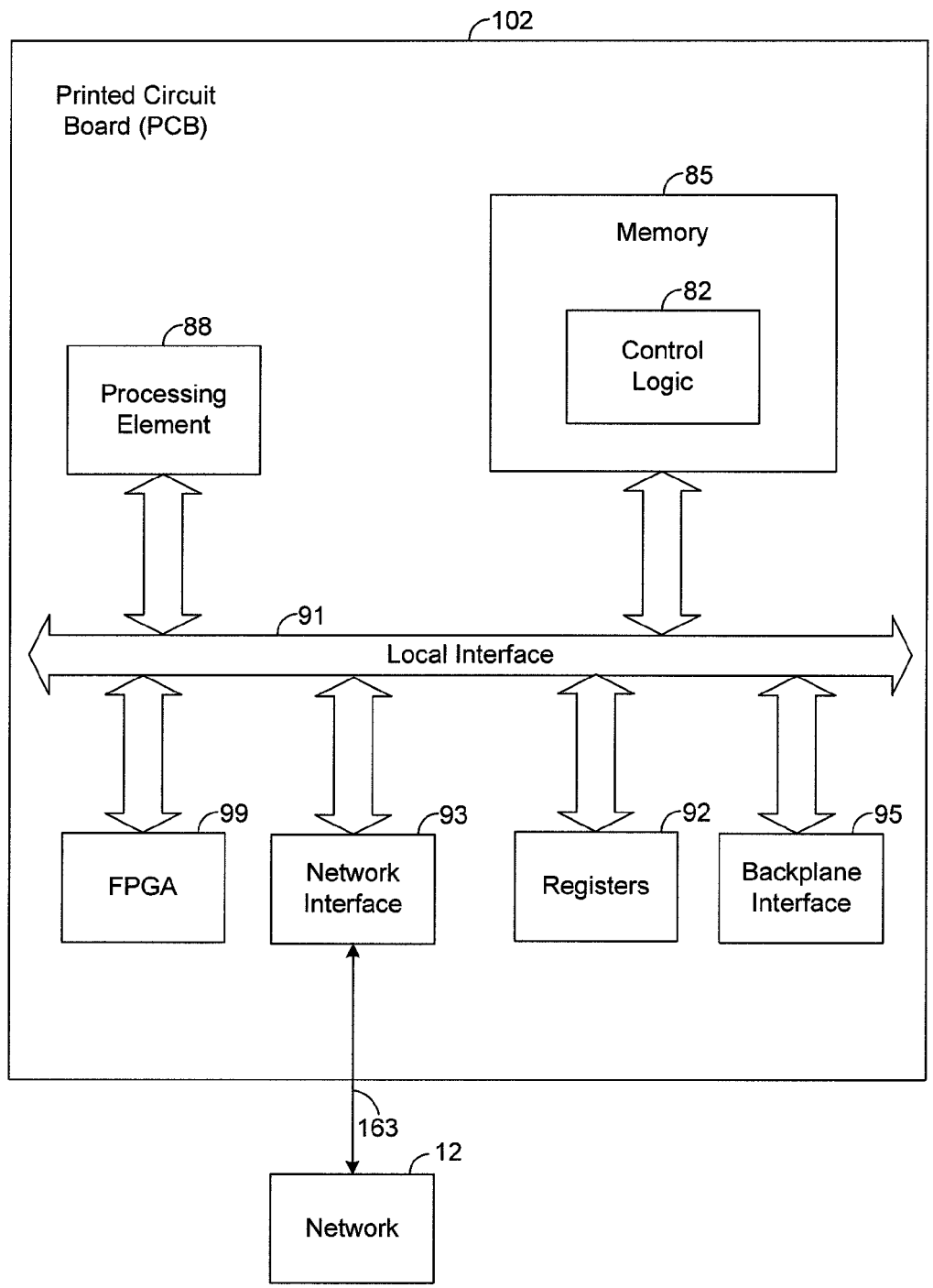
FIG. 4 is a block diagram illustrating an exemplary embodiment of a switch module 40, such as is depicted by FIG. 2.

FIG. 4 depicts an exemplary embodiment of the switch module 33. The exemplary switch module 33 shown by FIG.

4 comprises control logic 82 implemented in software and stored in memory 85. In other embodiments, the control logic 82 can be implemented in hardware or any combination of hardware, software, and/or firmware. The control logic 82, when implemented in software, can be stored and transported on any computer-readable medium for use by or in connection with an instruction execution apparatus that can fetch and execute instructions.

The exemplary embodiment of the switch module 33 depicted by FIG. 4 comprises at least one conventional processing element 88, such as a digital signal processor (DSP) or a central processing unit (CPU), that communicates to and drives the other elements within the module 33 via a local interface 91, which can include at least one bus. For example, when the control logic 82 is implemented in software, the processing element 88 retrieves and executes instructions of the control logic 82.

Furthermore, the switch module 33 has registers 92 for storing various configuration settings, as will be described in more detail hereafter. A backplane interface 95 comprises a connector for interfacing the module 33 with a backplane of a chassis (not shown in FIG. 4), as will be described in more detail hereafter. The switch module 33 has a field programmable gate array (FPGA) 99 for performing switching operations, as will be described in more detail hereafter. The switch module 33 also has a network interface 93 coupled to a network connection 163, such as a fiber optic cable. As shown by FIG. 4, the components of the switch module 33 reside on a single printed circuit board (PCB) 102, also referred to as "card," although it is possible for such components to reside on multiple PCBs in other embodiments.

The configuration settings in the registers 92 indicate how data from the network 12 and access modules 25a-c are to be routed. When a message (e.g., a data packet or a fragment) is received, the FPGA 99 based on the configuration settings in the registers 92 determines where to send the message. In one exemplary embodiment, the data packets received from the network 12 have VLAN tags in their headers, and the registers 92 indicate where the packets are to be transmitted based on their VLAN tags. Thus, upon receiving a data packet from the network 12, the FPGA 99 consults the registers 92 using the VLAN tag in the packet's header and, based on information in the registers 92, determines which of the modules 25a-c or 40 is to receive the packet. The FPGA 99 then transmits the packet to the appropriate module 25a-c.

In one exemplary embodiment, the fragments received by the switch module 33 from the modules 25a-c have port addresses in their headers, and the registers 92 indicate where the fragments are to be transmitted based on their port addresses. Thus, upon receiving a fragment from a module 25a-c, the FPGA 99 consults the registers 92 using the port address in the fragment's header and, based on information in the registers 92, determines which of the modules 25a-c is to receive the packet. The FPGA 99 then transmits the packet to the appropriate module 25a-c.

Figure 5:
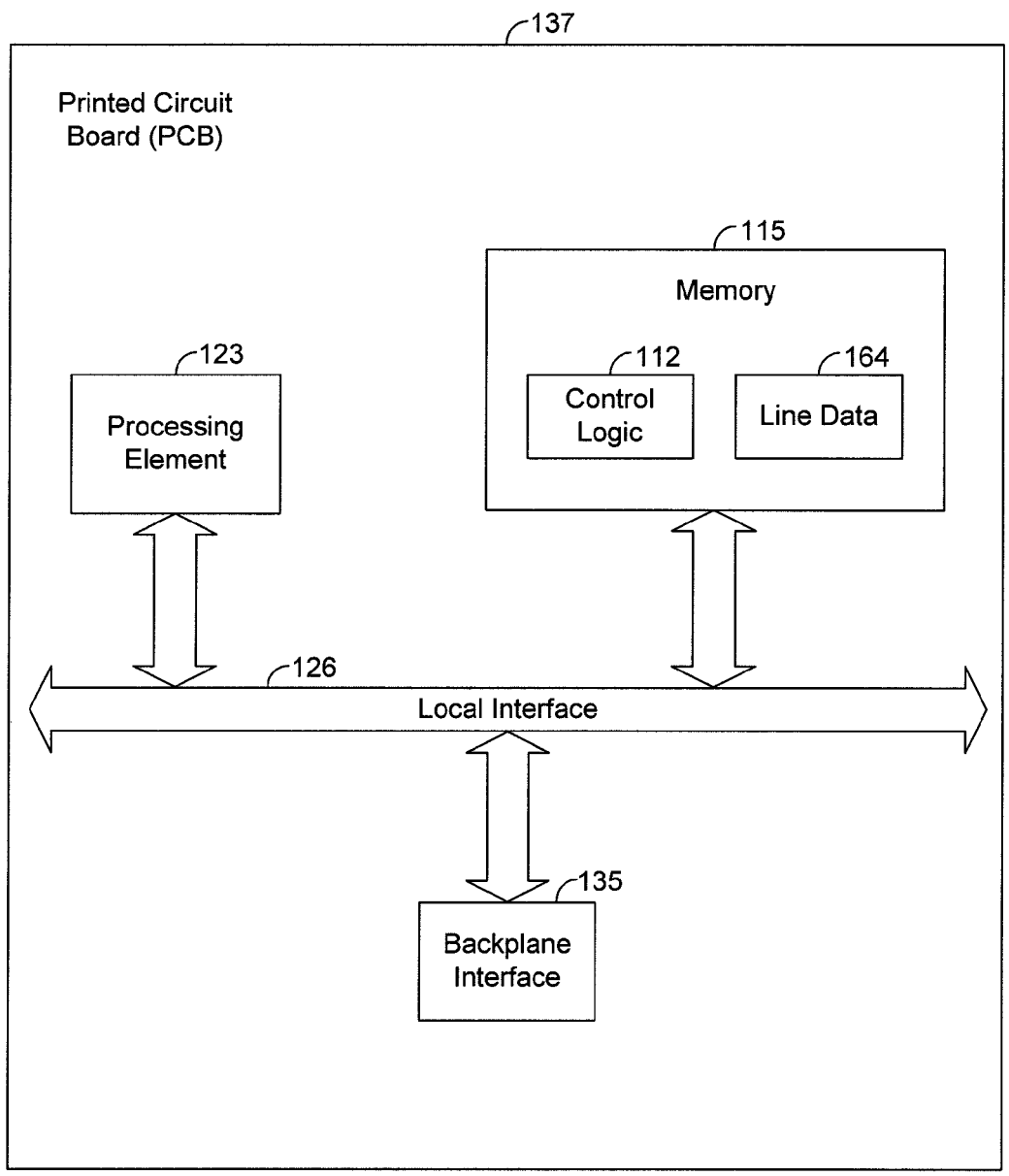
FIG. 5 is a block diagram illustrating an exemplary embodiment of a provision module, such as is depicted by FIG. 2.

FIG. 5 depicts an exemplary embodiment of the provision module 40. The exemplary provision module 40 shown by FIG. 5 comprises control logic 112 implemented in software and stored in memory 115. In other embodiments, the control logic 112 can be implemented in any combination of hardware, software, and/or firmware. The control logic 112, when implemented in software, can be stored and transported on any computer-readable medium for use by or in connection with an instruction execution apparatus that can fetch and execute instructions.

The exemplary embodiment of the provision module 40 depicted by FIG. 5 comprises at least one conventional processing element 123, such as a digital signal processor (DSP) or a central processing unit (CPU), that communicates to and drives the other elements within the module 40 via a local interface 126, which can include at least one bus. For example, when the control logic 112 is implemented in software, the processing element 123 retrieves and executes instructions of the control logic 112.

The provision module 40 also has a backplane interface 135, which comprises a connector for interfacing the module 25 with a backplane of a chassis (not shown in FIG. 5), as will be described in more detail hereafter. As shown by FIG. 5, the components of the module 40 reside on a single printed circuit board (PCB) 137, also referred to as a "card," although it is possible for the components of the protection module 40 to reside on more than one PCB, if desired.

Figure 6:
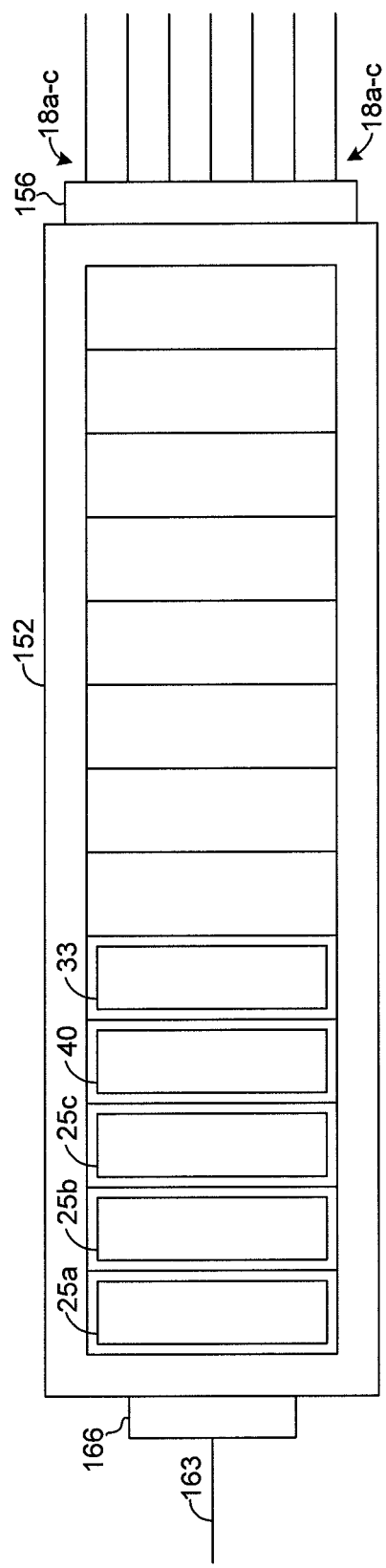
FIG. 6 depicts an exemplary chassis holding network facility equipment, such as is depicted by FIG. 2.

In one exemplary embodiment, the switch module 33, the access modules 25a-c, and the provision module 40 are respectively inserted into slots of a chassis 152, as shown by FIG. 6. FIG. 6 depicts one provision module 40, one switch module 33, and three access modules 25a-c, but other numbers of such modules are possible in other embodiments. Each of the subscriber lines 18a-c is coupled to a subscriber line interface 156 mounted on the chassis 152. The subscriber line interface 156 interfaces the subscriber lines 18a-c with a chassis backplane 161 (FIG. 7), which couples the subscriber lines 18a-c to the access modules 25a-c. The chassis backplane 161 also couples each module 25a-c and 40 to the switch module 33. In this regard, the backplane 161 comprises a plurality of conductive connections (e.g., copper traces) for conductively coupling the subscriber lines 18a-c and the modules 25a-c and 40 to the switch module 33. The chassis backplane 161 is conductively coupled to the backplane interface 75 (FIG. 3) of each access module 25a-c, the backplane interface 95 (FIG. 4) of the switch module 33, and the backplane interface 135 (FIG. 5) of the provision module 40.

Figure 7:
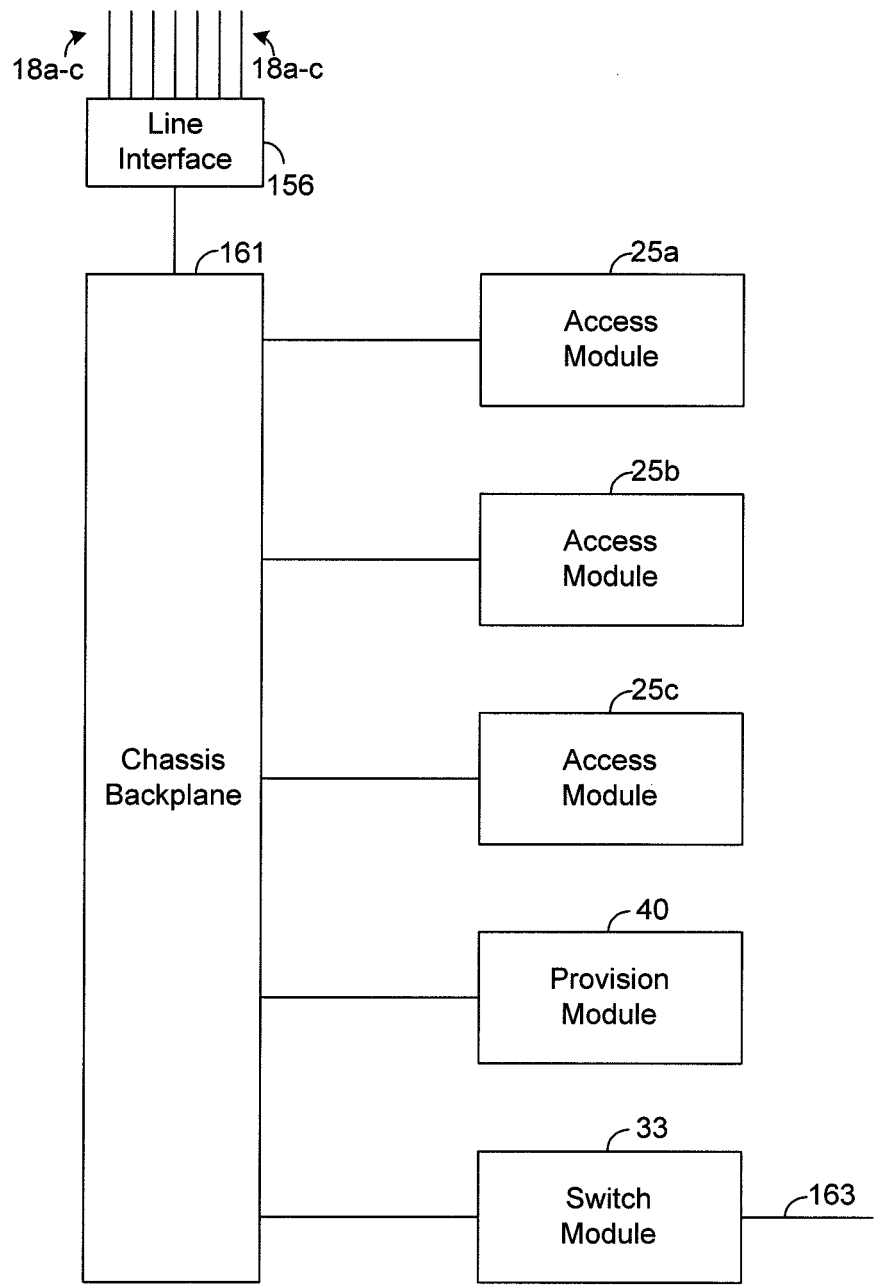
FIG. 7 is a block diagram illustrating an exemplary embodiment of network facility equipment, such as is depicted by FIG. 2.

A network connection 163, such as a fiber optic cable, for example, carrying a high-speed data stream is coupled to the switch module 33, as shown by FIG. 7. If the network connection 163 is indeed fiber optic, the switch module 33 may include a fiber optic transceiver (not shown) to convert optical signals from the connection 163 into electrical signals and for converting electrical signals from the switch module 33 into optical signals.

The embodiment shown by FIG. 7 is exemplary, and various modifications may be made to such embodiment. For example, the network connection 163 may be coupled to the switch module 33 through the chassis backplane 161, and/or the subscriber lines 18a-c may be coupled directly to the access modules 25a-c similar to how the network connection 163 is coupled directly to the switch module 33.

In one exemplary embodiment, the provision module 40 is configured to provision the configuration settings of the registers 72a-c of the access modules 25a-c and the registers 92 of the switch module 33. In this regard, the control logic 112 of the provision module 40 receives a request, referred to hereafter as a "provision request," indicative of a bonding group to be added. For example, the provision request may include the port address of each port 27a-c that is to be coupled to a subscriber line 18a-c of a particular bonding group. In one exemplary embodiment, the provision request is defined by user input received at a remote device and communicated through the network 12 to the provision module 40. In another embodiment, the backplane 161 of the chassis 152 is coupled to an interface (not shown), such as a serial data port, that receives data from a user device, such as a computer. A user, such as a technician who installs the access modules 25a-c or couples the modules 25a-c to subscriber lines 18a-c, provides inputs defining a provision request that is transmitted across the chassis backplane 161 to the provision module 40. Other techniques for communicating a provision request to the provision module 40 are possible in other embodiments.

Upon receiving a provision request, the control logic 112 of the module 40 automatically selects one of the bonding engines 29a-c for bonding the ports 27a-c (and, therefore, the subscriber lines 18a-c coupled to such ports) identified by the port addresses of the provision request. The control logic 112 then provisions the registers 72a-c of the access modules 25a-c and the registers 92 of the switch module 33 such that the selected bonding engine 29a-c performs such bonding. Thus, the control logic 112 assigns one of the bonding engines 29a-c to the bonding group indicated by the provision request. Note that the phrase "bonding of ports" shall be used interchangeably with the phrase "bonding of subscriber lines." In this regard, saying that a bonding engine bonds two ports is synonymous with saying that the bonding engine bonds the two subscriber lines that are coupled to the two ports.

The assignment of a bonding engine to a bonding group can be based on various factors. In one exemplary embodiment, the assignment is based on which of the bonding engines 29a-c are local to at least one of the subscriber lines 18a-c of the bonding group and the extent to which each of the bonding engines 29a-c is already assigned to external subscriber lines 18a-c.

For example, in one exemplary embodiment, for each respective bonding group, the control logic 112 of the provision module 40, if possible, assigns a bonding engine to the group only if the group has at least one subscriber line 18a-c local to the access module on which the bonding engine resides. As a mere example, the control logic 112 assigns the bonding engine 29a to a bonding group only if the bonding group includes at least one subscriber line 18a that is local to the engine 29a. Thus, the bonding engine 29 assigned to the bonding group bonds at least one subscriber line 18 that is coupled to and terminated by the access module 25 on which the bonding engine 29 resides.

Ensuring that the bonding engine 29 for a bonding group bonds at least one local subscriber line 18 (i.e., a subscriber line 18 that is coupled to and terminated by the access module 25 on which the bonding engine 29 resides) helps to prevent a technician from inadvertently disrupting the bonding group. In this regard, assume that a technician desires to rearrange the configuration of the chassis 152 by disconnecting at least some of the access modules from the chassis backplane 161 and removing such access modules from the chassis 152. Before disconnecting a particular access module 25 from the chassis backplane 161, the technician may first monitor each of the subscriber lines 18 coupled to the access module 25. If any of such subscriber lines 18 are active (e.g., carrying data), then the technician is aware that disconnecting the access module 25 will disrupt the communication occurring across each active subscriber line 18. In response to a determination that at least one of the local subscriber lines 18 is active, the technician may refrain from disconnecting the access module 25 thereby preventing disruption of the communication occurring across the active subscriber line 18.

Moreover, ensuring that each bonding engine 29 services at least one local subscriber line 18 may help to prevent the technician from removing an access module 25 that has an active bonding engine 29. In this regard, if the technician monitors the subscriber lines 18 of a particular access module 25, as described above, before disconnecting such access module 25 from the chassis backplane 161 and if the module's bonding engine 29 is active, then the technician should see that at least one subscriber line 18 (i.e., the local subscriber line 18 serviced by the module's bonding engine 29) is active. The technician should, therefore, refrain from disconnecting the access module 25 from the chassis backplane 161. However, if the active bonding engine 29 of the access module 25 to be disconnected services only external subscriber lines 18, then it is possible for all of the local lines 18 of the access module 25 to be inactive even though the module's bonding engine 29 is active. Thus, not realizing that the access module 25 is presently bonding external subscriber lines 18, a technician may disconnect the access module 25 from the chassis backplane 161 thereby causing all of the subscriber lines 18 being bonded by the active bonding engine 29 on the disconnected access module 25 to go down (i.e., to stop communicating). Thus, ensuring that at least one subscriber line 18 of a bonding group is coupled to the access module 25 of the group's bonding engine 29 helps to prevent an inadvertent disruption to the services provided by the bonding group.

Moreover, in one exemplary embodiment, the control logic 112 determines which of the bonding engines 29a-c of FIG. 2 are candidates for being selected to bond a particular bonding group based on which subscriber lines 18a-c are assigned to the bonding group. In this regard, for a bonding engine 29a-c to be a candidate, at least one of the subscriber lines 18a-c of the bonding group should be local to the bonding engine 29a-c (i.e., coupled to and terminated by the access module 25a-c on which the bonding engine 29a-c resides). After determining the candidate bonding engines 29a-c, the control logic 112 selects one of the candidate bonding engines 29a-c based on the extent to which the candidate bonding engines 29a-c are assigned to external subscriber lines 18a-c.

For example, in one exemplary embodiment, the control logic 112 maintains a respective value, referred to hereafter as the "external line count," for each bonding engine 29a-c. The external line count indicates the number of external subscriber lines to which the bonding engine 29a-c is currently assigned. The external line counts for the bonding engines 29a-c are stored in the memory 137 of the provision module 40 as line data 164 shown in FIG. 5.

In one exemplary embodiment, when selecting a bonding engine 29a-c for servicing a given bonding group, the control logic 112 selects the candidate bonding engine 29a-c associated with the lowest external line count. That is, the control logic 112 selects the candidate bonding engine 29a-c that is currently assigned to the least number of external subscriber lines. If multiple candidate bonding engines 29a-c are associated with the lowest external line count, then the control logic 112 can arbitrarily select among such candidate bonding engines, or alternatively the control logic 112 could select among such candidate bonding engines based on some other factor. As a mere example, the control logic 112 can select the candidate bonding engine 29a-c that is associated with the lowest external line count and that is assigned to the lowest number of overall subscriber lines 18a-c.

Assigning, to a bonding group, the bonding engine 29a-c servicing the least number of external subscriber lines, as described above, helps to prevent any one of the bonding engines 29a-c from being assigned a significantly disproportionate number of external subscriber lines relative to the other bonding engines 29a-c. Accordingly, as more and more ports 27a-c are assigned to bonding groups, it is less likely that a point is reached where each of the candidate access modules 25a-c for a new bonding group has an insufficient number of available local ports 27a-c to accommodate the bonding group. Thus, the system is able to accommodate more bonding groups for which each bonding group is assigned a bonding engine that is local to at least one subscriber line of the bonding group.

It should be noted that the techniques described above for allocating bonding engines among bonding groups are exemplary. In other embodiments, other techniques may be employed to ensure that each of the bonding engines is not assigned a significantly disproportionate number of external subscriber lines 18a-c. Such other techniques may be based on the external line counts described herein, or such other techniques may be based on other information in addition to or in lieu of the external line counts.

An exemplary use and operation of the system 10 will be described in more detail below with particular reference to FIG. 8.

For illustrative purposes, assume that there are three access modules 25a-c inserted into the chassis 152, as shown by FIG. 6. In other embodiments, other numbers of access modules 25a-c may be inserted into the chassis 152 or otherwise cross-connected such that a bonding engine 29a-c of one module 25a-c can bond ports 27a-c of the other modules 25a-c.

Further assume that there are no subscriber lines 18a-c coupled to any of the access modules 25a-c and that all of the ports 27a-c of all of the access modules 27a-c are currently available for accommodating new bonding groups. Thus, the external line count for each bonding engine 29a-c is equal to zero (0) indicating that each of the bonding engines 29a-c is not currently assigned to an external subscriber line 18a-c. Also, assume that a technician initiates provisioning for a bonding group that has two subscriber lines. In this regard, assume that the technician assigns one of the subscriber lines to a port 27a of the access module 25a and assigns the other subscriber line to a port 27b of the access module 25b. Thus, the technician physically couples a subscriber line 18a of the bonding group to a port 27a of access module 25a and couples another subscriber line 18b of the bonding group to a port 27b of access module 25b. The technician then submits a provision request that is transmitted to the provision module 40. The provision request includes the port addresses of the two ports 27a-b that are assigned to the two subscriber lines 18a-b of the bonding group.

Figure 8:
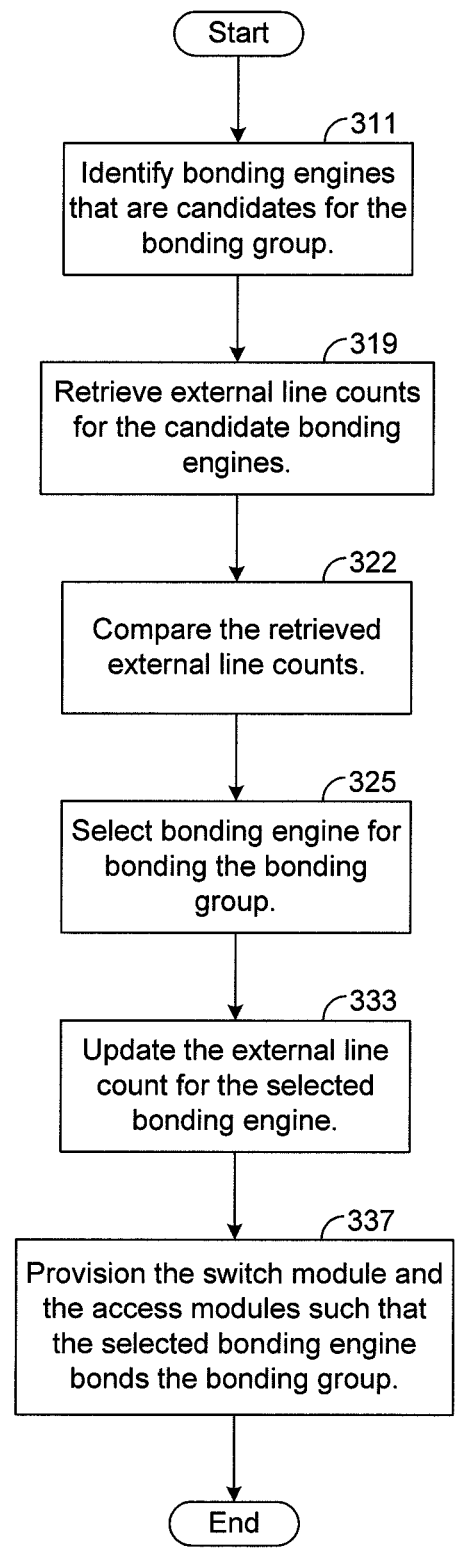
FIG. 8 is a flow chart illustrating an exemplary method for assigning a bonding engine to a bonding group.

Upon receiving the provision request, the control logic 112 of the provision module 40 assigns one of the bonding engines 29a-c to the bonding group, referred to hereafter as the "initial bonding group." In this regard, as shown by block 311 of FIG. 8, the control logic 112 first determines which of the bonding engines 29a-c are candidates for the initial bonding group based on which ports 17a-c are assigned to the initial bonding group. In particular, the control logic 112 identifies a bonding engine 29a-c as a candidate for the initial bonding group if the engine 29a-c resides on a module 25a-c having at least one port 27a-c assigned to the bonding group. In the instant example, only access modules 25a and 25b have at least one port 27a-b assigned to the initial bonding group. Thus, access modules 25a and 25b are selected as candidates for the initial bonding group thereby eliminating the bonding engine 29c on access module 25c from possible consideration for servicing the initial bonding group.

After identifying the candidate bonding engines 29a-b, the control logic 112 retrieves the external line counts of the candidate bonding engines 29a-b from the line data 164 (FIG. 5) and compares the retrieved values, as shown by blocks 319 and 322 of FIG. 8. The control logic 112 selects a candidate bonding engine associated with the least number of external subscriber lines for bonding the initial bonding group, as shown by block 325 of FIG. 8. In the instant example, the external line count for the bonding engine 29a is the same (i.e., zero) as the external line count for the bonding engine 29b. Thus, the control logic 112 arbitrarily (or based on some other factor) selects one of the bonding engines 29a or 29b for servicing the initial bonding group. For illustrative purposes, assume that the control logic 112 selects the bonding engine 29a.

In the instant example, the control logic 112 assigns the bonding engine 29a to the initial bonding group. As shown by block 333 of FIG. 8, the control logic 112 updates the external line count of such bonding engine 29a. Since the initial bonding group has one external subscriber line 18b relative to the selected bonding engine 29a, the control logic 112 increases the external line count for the selected bonding engine 29a to a value of one (1). The external line counts for the other bonding engines 29b-c are left unchanged at zero (0).

After selecting the bonding engine 29a for servicing the initial bonding group, the control logic 112 provisions the access modules 25a-c and the switch module 33 as appropriate such that the selected bonding engine 29a bonds the initial bonding group, as shown by block 337 of FIG. 8. In this regard, the control logic 112 updates the registers 72a-b (FIG. 3) of the access modules 25a and 25b and the registers 92 (FIG. 4) of the switch module 33 such that the bonding engine 29a bonds the two ports 27a-b coupled to the two subscriber lines 18a-b of the initial bonding group. Thus, packets from the network 12 to be carried by such bonding group are routed to the bonding engine 29a, which fragments each packet into a plurality of fragments. Such fragments are then carried by the two subscriber lines 18a-b of the initial bonding group.

Now assume that the technician initiates provisioning for a bonding group that has three subscriber lines. In this regard, assume that the technician assigns one of the subscriber lines 18a to a port 27a of the access module 25a, assigns another subscriber line 18b to a port 27b of the access module 25b, and assigns the final subscriber line 18c to a port 27c of the access module 25c. Thus, the technician physically couples one of the subscriber lines 18a to a port 27a of access module 25a, couples another subscriber line 18b to a port 27b of access module 25b, and couples the final subscriber line 18c to a port 27c of access module 25c. The technician then submits a provision request that is transmitted to the provision module 40. The provision request includes the port addresses of the three ports 27a-c that are assigned to the three subscriber lines 18a-c of the bonding group.

Upon receiving the provision request, the control logic 112 of the provision module 40 assigns one of the bonding engines 29a-c to the bonding group, referred to hereafter as the "new bonding group." In this regard, the control logic 112 first determines which of the bonding engines 29a-c are candidates for the new bonding group based on which ports 27a-c are assigned to the new bonding group. In particular, the control logic 112 identifies a bonding engine 29a-c as a candidate for the new bonding group if the engine 29a-c resides on a module 25a-c having at least one port 27a-c assigned to the bonding group. In the instant example, all three access modules 25a-c have at least one port 27a-c assigned to the new bonding group. Thus, all three access modules 25a-c are selected as candidates for the new bonding group thereby eliminating none of the bonding engines 29a-c from possible consideration for servicing the new bonding group.

After identifying the candidate bonding engines 29a-c, the control logic 112 retrieves the external line counts of the candidate bonding engines 29a-c from the line data 164 and compares the retrieved values, as shown by blocks 319 and 322 of FIG. 8. The control logic 112 selects a candidate bonding engine associated with the least number of external subscriber lines for bonding the new bonding group, as shown by block 325 of FIG. 8. In the instant example, the external line count for the bonding engine 29*a* has a value of one (1) indicating that the bonding engine 29*a* is currently assigned to one external subscriber line 18*b*. Further, the external line count for each of the bonding engines 29*b* and 29*c* is zero (0). Since the external line count for the bonding engine 29*a* is higher than at least one other candidate bonding engine 29*b* or 29*c*, the control logic 112 eliminates the bonding engine 29*a* from possible consideration for servicing the new bonding group. At this point, only bonding engines 29*b* and 29*c* are still candidates for the new bonding group. Since the external line count values for these two bonding engines 29*b* and 29*c* are the same, the control logic 112 arbitrarily (or based on some other factor) selects one of the bonding engines 29*b* or 29*c* for servicing the new bonding group. For illustrative purposes, assume that the control logic 112 selects the bonding engine 29*b*.

In the instant example, the control logic 112 assigns the bonding engine 29*b* to the new bonding group. As shown by block 333 of FIG. 8, the control logic 112 updates the external line count of such bonding engine 29*b*. Since the new bonding group has two external subscriber lines 18*a* and 18*c* relative to the selected bonding engine 29*b*, the control logic 112 increases the external line count for the selected bonding engine 29*b* to a value of two (2). The external line counts for the other bonding engines 29*a* and 29*c* are left unchanged at one (1) and zero (0), respectively.

After selecting the bonding engine 29*b* for servicing the new bonding group, the control logic 112 provisions the access modules 25*a-c* and the switch module 33 as appropriate such that the selected bonding engine 29*b* bonds the new bonding group, as shown by block 337 of FIG. 8. In this regard, the control logic 112 updates the registers 72*a-c* (FIG. 3) of the access modules 25*a-c* and the registers 92 (FIG. 4) of the switch module 33 such that the bonding engine 29*b* bonds the three ports 27*a-c* coupled to the three subscriber lines 18*a-c* of the new bonding group. Thus, packets from the network 12 to be carried by the new bonding group are routed to the bonding engine 29*b*, which fragments each packet into a plurality of fragments. Such fragments are then carried by the subscriber lines 18*a-c* of the new bonding group.

Since the bonding engine 29*c* now exclusively has the lowest external line count (i.e., zero), the bonding engine 29*c* will be selected by the control logic 112 for servicing the next bonding group to which a port 27*c* of the access module 25*c* is assigned.

The foregoing examples and the flow chart depicted by FIG. 8 have presented herein for illustrative purposes. It would be apparent to one of ordinary skill in the art upon reading this disclosure that various modifications and changes to the exemplary embodiments described above are possible without departing from the spirit and scope of the present disclosure.

Now, therefore, the following is claimed:

1. A system for allocating bonding engines, comprising:
a chassis having a backplane and a plurality of slots;
a plurality of access modules coupled to and terminating a plurality of subscriber lines, each of access modules having at least one bonding engine, wherein each of the access modules is inserted into a respective one of the slots of the chassis and is conductively coupled to the other access modules via the backplane; and
logic configured to determine a value indicative of a total number of subscriber lines that (1) are to be bonded by a bonding engine of one of the access modules and (2) are terminated by the plurality of access modules without being terminated by the one access module, the logic further configured to perform comparisons between the value and a plurality of values respectively associated with the plurality of access modules, each of the plurality of values indicating a total number of subscriber lines that (1) are to be bonded by a bonding engine of an associated access module and (2) are terminated by the plurality of access modules without being terminated by the associated access module, the logic configured to select, based on the comparisons, the bonding engine of the one access module for assigning the selected bonding engine to a bonding group, the logic further configured to provision the one access module such that the bonding engine of the one access module bonds each subscriber line of the bonding group.

2. The system of claim 1, wherein the logic is configured to make a determination as to which bonding engine of the plurality of access modules is currently assigned to a least number of external subscriber lines, and wherein the logic is configured to assign the bonding engine of the one access module to the bonding group based on the determination.

3. The system of claim 1, wherein the logic is configured to select the bonding engine of the one access module as a candidate for servicing the bonding group in response to a determination that at least one subscriber line of the bonding group is terminated by the one access module.

4. The system of claim 1, wherein each of the access modules resides at a facility of a network.

5. The system of claim 1, wherein each of the access modules resides at a central office of a network.

6. The system of claim 1, wherein the logic is configured to select the bonding engine of the one access module for assigning the selected bonding engine to the bonding group based on whether at least one subscriber line of the bonding group is terminated by the one access module.

7. The system of claim 1, wherein each subscriber line within the total number of subscriber lines is not within the bonding group.

8. A system for allocating bonding engines, comprising:
a plurality of bonding engines residing on a plurality of access modules; and
logic configured receive a provision request indicating a plurality of subscriber lines to be bonded, the logic configured to make a determination, based on comparisons between values, as to which of the bonding engines is currently assigned to a least number of external subscriber lines, wherein each of the values indicates a total number of external subscriber lines assigned to a bonding engine of a respective one of the access modules, the logic further configured to select, based on the determination, one of the bonding engines for bonding the plurality of subscriber lines.

9. The system of claim 8, wherein the logic is configured to select the one bonding engine for bonding the plurality of subscriber lines based on whether at least one of the plurality of subscriber lines is coupled to the access module on which the one bonding engine resides.

10. The system of claim 8, wherein the logic is configured to provision the access modules such that the one bonding engine bonds the plurality of subscriber lines.

11. The system of claim 8, wherein each of the bonding engines resides on a respective access module terminating at least one of the subscriber lines, and wherein the logic is configured to select the one bonding engine for bonding the plurality of subscriber lines if the one bonding engine is currently assigned to the least number of external subscriber lines.

12. The system of claim 8, wherein the logic is configured select the one bonding engine for bonding the plurality of subscriber lines in response to a determination that one of the access modules on which the one bonding engine resides terminates at least one of the plurality of subscriber lines to be bonded and in response to a determination that the total number is less than a total number of subscriber lines that (1) are to be bonded by a bonding engine of another of the access modules and (2) are terminated by the plurality of access modules without being terminated by the other access module.

13. A system for allocating bonding engines, comprising:
a plurality of bonding engines residing on a plurality of access modules; and
logic configured receive a provision request indicating a plurality of subscriber lines to be bonded, the logic configured to determine a value indicative of a total number of subscriber lines that (1) are assigned to one of the bonding engines and (2) are terminated by the plurality of access modules without being terminated by one of the access modules on which the one bonding engine resides, the logic configured to perform comparisons between the value and a plurality of values respectively associated with the plurality of access modules, each of the plurality of values indicating a total number of subscriber lines that (1) are assigned to a bonding engine of an associated access module and (2) are terminated by the plurality of access modules without being terminated by the associated access module, the logic further configured to select the one bonding engine for bonding the plurality of subscriber lines based on the comparisons.

14. The system of claim 13, wherein the logic is configured to select the one bonding engine for bonding the plurality of subscriber lines based on whether at least one of the plurality of subscriber lines is terminated by the one access module.

15. A method for assigning bonding engines to bonding groups, comprising the steps of:
receiving a provision request indicating a plurality of subscriber lines to be bonded;
comparing values, each of the values indicating a total number of external subscriber lines assigned to a bonding engine of a respective one of a plurality of access modules;
determining which of a plurality of bonding engines is currently assigned to a least number of external subscriber lines based on the comparing step, the plurality of bonding engines residing on the plurality of access modules;
assigning one of the bonding engines to the plurality of subscriber lines to be bonded based on the determining step; and
provisioning the access modules such that the one bonding engine bonds each of the plurality of subscriber lines.

16. The method of claim 15, further comprising the step of determining which of the bonding engines are local to at least one of the plurality of subscriber lines, wherein the assigning step is based on each of the determining steps.

17. The method of claim 15, further comprising the steps of:
determining that one of the access modules on which the one bonding engine resides terminates at least one of the plurality of subscriber lines to be bonded;
determining that the total number is less than a total number of subscriber lines that (1) are to be bonded by a bonding engine of another of the access modules and (2) are terminated by the plurality of access modules without being terminated by the other access module,
wherein the assigning step is based on each of the determining steps.

18. A method for allocating bonding engines, comprising the steps of:
determining a value indicative of a total number of subscriber lines that (1) are assigned to a bonding engine of one of a plurality of access modules for bonding by the bonding engine and (2) are terminated by the plurality of access modules without being terminated by the one access module;
comparing the value with a plurality of values respectively associated with the plurality of access modules, each of the plurality of values indicating a total number of subscriber lines that (1) are to be bonded by a bonding engine of an associated access module and (2) are terminated by the plurality of access modules without being terminated by the associated access module;
selecting, based on the comparing step, the bonding engine for bonding a group of subscriber lines; and
provisioning the access module such that the bonding engine bonds the group of subscriber lines.

19. The method of claim 18, further comprising the step of determining whether at least one of the subscriber lines is terminated by the one access module, wherein the selecting step is based on the step of determining whether at least one of the subscriber lines is terminated by the one access module.

20. The method of claim 18, further comprising:
determining whether at least one subscriber line of the group of subscriber lines is terminated by the one access module,
wherein the selecting step is based on the step of determining whether at least one subscriber line of the group of subscriber lines is terminated by the one access module.

21. A system for allocating bonding engines, comprising:
a chassis having a backplane and a plurality of slots;
a plurality of access modules coupled to and terminating a plurality of subscriber lines, each of access modules having at least one bonding engine, wherein each of the access modules is inserted into a respective one of the slots of the chassis and is conductively coupled to the other access modules via the backplane; and
logic configured to determine a value indicative of a total number of subscriber lines that (1) are to be bonded by a bonding engine of one of the access modules and (2) are terminated by the plurality of access modules without being terminated by the one access module, the logic further configured to select, based on the value, the bonding engine of the one access module for assigning the selected bonding engine to a bonding group, the logic further configured to provision the one access module such that the bonding engine of the one access module bonds each subscriber line of the bonding group,
wherein the logic is configured to identify which of the access modules terminate at least one subscriber line of the bonding group and to identify which bonding engine of the identified access modules is currently assigned to a least number of external subscriber lines, and wherein the bonding engine of the one access module is identified by the logic as currently assigned to the least number of external subscriber lines.

22. A system for allocating bonding engines, comprising:
a chassis having a backplane and a plurality of slots;
a plurality of access modules coupled to and terminating a plurality of subscriber lines, each of access modules having at least one bonding engine, wherein each of the access modules is inserted into a respective one of the slots of the chassis and is conductively coupled to the other access modules via the backplane; and logic configured to determine a value indicative of a total number of subscriber lines that are (1) to be bonded by a bonding engine of one of the access modules and (2) are terminated by the plurality of access modules without being terminated by the one access module, the logic further configured to select, based on the value, the bonding engine of the one access module for assigning the selected bonding engine to a bonding group, the logic further configured to provision the one access module such that the bonding engine of the one access module bonds each subscriber line of the bonding group, wherein the logic is configured to assign the bonding engine of the one access module to the bonding group in response to a determination that the one access module terminates at least one subscriber line of the bonding group and in response to a determination that the total number is less than a total number of subscriber lines that (1) are to be bonded by a bonding engine of another of the access modules and (2) are terminated by the plurality of access modules without being terminated by the other access module.

* * * * *